US010476341B2

(12) United States Patent
Pondelek et al.

(10) Patent No.: US 10,476,341 B2
(45) Date of Patent: Nov. 12, 2019

(54) MOTOR ASSEMBLY (71) Applicant: BROSE FAHRZEUGTEILE GMBH & CO. KOMMANDITGESELLSCHAFT, WUERZBURG, Wuerzburg (DE)

(72) Inventors: Martin Pondelek, Wuerzburg (DE); Stephan Roos, Wertheim-Hoehefeld (DE)

(73) Assignee: Brose Fahrzeugteile GmbH & Co. Kommanditgesellschaft, Wuerzburg, Wuerzburg (DE)

(*) Notice: Subject to any disclaimer, the term of this patent is extended or adjusted under 35 U.S.C. 154(b) by 93 days.

(21) Appl. No.: 15/055,821

(22) Filed: Feb. 29, 2016

(65) Prior Publication Data
US 2016/0254719 A1    Sep. 1, 2016

(30) Foreign Application Priority Data

Feb. 27, 2015  (DE) .................. 10 2015 002 562
Sep. 4, 2015   (DE) .................. 10 2015 217 018
Oct. 2, 2015   (DE) .................. 10 2015 219 149

(51) Int. Cl.
H02K 5/06    (2006.01)
H02K 5/08    (2006.01)
(Continued)

(52) U.S. Cl.
CPC ........... *H02K 5/02* (2013.01); *F16H 57/0476* (2013.01); *F16H 61/0006* (2013.01); *H02K 5/06* (2013.01);
(Continued)

(58) Field of Classification Search
CPC .. H02K 5/02; H02K 5/04; H02K 5/06; H02K 5/22; H02K 5/225; H02K 11/30;
(Continued)

(56) References Cited

U.S. PATENT DOCUMENTS 7,847,446 B2    12/2010  Becker et al.
2002/0060105 A1*  5/2002  Tominaga ............ B62D 5/0406
                                                180/443
(Continued)

FOREIGN PATENT DOCUMENTS

CN   202009303 A    10/2011
DE   10010439 A1    9/2001
(Continued)

OTHER PUBLICATIONS

Machine Translation of DE102015002562.7.*
Fujimoto, Machine Translation of FR2841525, Jan. 2004 (Year: 2004).*

*Primary Examiner* — Quyen P Leung
*Assistant Examiner* — Eric Johnson
(74) *Attorney, Agent, or Firm* — Laurence A. Greenberg; Werner H. Stemer; Ralph E. Locher (57) ABSTRACT

A motor assembly has an electric motor with a motor housing and an electronics unit. A first housing shell is formed as a motor carrier and has the motor housing fastened to it. A second housing shell is in the form of a cooling cover. An electronics carrier is arranged in sandwich-like fashion between the motor carrier and the cooling cover. The cooling cover and the motor carrier exhibit greater thermal conductivity than the electronics carrier. The cooling cover and the motor carrier are coupled to one another in heat-conducting fashion at at least one abutment surface.

11 Claims, 6 Drawing Sheets (51) Int. Cl.
*H02K 9/22* (2006.01)
*H02K 11/00* (2016.01)
*F16H 57/04* (2010.01)
*F16H 61/00* (2006.01)
*H02K 5/02* (2006.01)
*H02K 11/33* (2016.01)

(52) U.S. Cl.
CPC ................. *H02K 5/08* (2013.01); *H02K 9/22* (2013.01); *H02K 11/33* (2016.01)

(58) Field of Classification Search
CPC ........ H02K 11/33; H02K 11/38; H02K 11/40; H02K 9/19; H02K 9/193; H02K 9/197; H02K 5/08; H02K 5/10; H02K 5/12; H02K 5/124; H02K 5/132; H02K 9/22; F16H 57/0476; F16H 61/0006
USPC ............... 310/54, 6, 86, 68 D, 85–88, 64–65
See application file for complete search history.

(56) References Cited

U.S. PATENT DOCUMENTS

| | | | |
|---|---|---|---|
| 2002/0163279 A1 | 11/2002 | Mueller et al. | |
| 2006/0108884 A1* | 5/2006 | Shiino | B60T 8/267 310/89 |
| 2008/0318724 A1* | 12/2008 | Lott | F16H 61/32 475/149 |
| 2009/0078489 A1 | 3/2009 | Feier et al. | |
| 2009/0174269 A1* | 7/2009 | Ibaraki | F16C 33/664 310/90 |
| 2011/0181221 A1 | 7/2011 | Asahi et al. | |
| 2012/0313467 A1* | 12/2012 | Omae | B62D 5/0406 310/71 |
| 2013/0248277 A1* | 9/2013 | Hagiwara | B62D 5/0406 180/443 |
| 2013/0300222 A1* | 11/2013 | Nakano | H02K 9/22 310/43 |
| 2015/0216083 A1* | 7/2015 | Kanazawa | H02K 7/116 310/52 |
| 2015/0357886 A1* | 12/2015 | Ishizeki | F04D 25/06 310/71 |

FOREIGN PATENT DOCUMENTS

| | | | | |
|---|---|---|---|---|
| DE | 10229606 A1 | 1/2004 | | |
| DE | 102005062784 A1 | 7/2007 | | |
| DE | 102006032780 A1 | 1/2008 | | |
| DE | 102008040318 A1 | 1/2010 | | |
| FR | 2841525 A1 * | 1/2004 | ........... | B62D 5/0406 |
| JP | WO 2014104121 A1 * | 7/2014 | ............. | H02K 5/225 |
| WO | 2008146664 A1 | 12/2008 | | |
| WO | 2013037454 A2 | 3/2013 | | |

* cited by examiner

MOTOR ASSEMBLY

BACKGROUND OF THE INVENTION

Field of the Invention

The invention relates to a motor assembly having an electric motor comprising a motor housing, and an electronics unit. The invention also relates to an actuator, in particular a gearbox actuator, for a motor vehicle, having a motor assembly of said type, and to a motor vehicle gearbox equipped with an actuator of said type.

WO 2013/037454 A2 has disclosed an electric motor which may be a constituent part of an actuator for a motor vehicle gearbox, in particular for a direct shift gearbox (DSG). In the case of a hydraulic actuator, the electric motor may serve for driving a hydraulic pump.

For this purpose, the known electric motor has a cylindrical motor or stator housing in which a stator assembly with a rotating-field coil is mounted so as to be fixed with respect to the housing, and a rotor together with a rotor shaft fixed to the rotor is mounted in rotationally movable fashion. For the coupling for example to the hydraulic pump of the actuator, the motor shaft is led out, so as to form a shaft stub, on one housing side of the electric motor. The opposite housing side has an attachment flange for the fastening of the actuator for example to an electronics unit having an electronics housing and having power or motor electronics.

During the operation of an electric motor of said type, in particular in the case of said electric motor being used as a gearbox actuator for a DSG of a motor vehicle, said electric motor is commonly coupled in terms of drive to a hydraulic oil pump within an oil sump of a gearbox housing. For the purposes of cooling the rotating-field coil, it is known here for the electric motor to be situated at least partially within a (hydraulic) oil in the oil sump. In this way, the heat of the rotating-field coil generated as a result of energization is at least partially dissipated to the oil.

Here, the electric motor or the associated motor assembly of the actuator should be designed, or structurally configured, for a relatively large temperature range. The temperature range that must be managed or allowed for in the oil sump typically lies between for example −40° C. and +130° C. The electronics unit is expediently installed close to the electric motor, wherein in particular, the relatively high temperatures that arise during operation have a damaging effect on electronic components and on the function of the electronics unit.

US 2009/0078489 A1 has disclosed a motor assembly for a gearbox actuator, in the case of which motor assembly the motor housing of the electric motor is connected in thermally conductive fashion to a gearbox housing of the motor vehicle gearbox. Here, the large thermal mass of the gearbox housing acts as an effective heat sink for the dissipation of heat from the electric motor. The associated electronics unit is decoupled from the electric motor in terms of heat conduction by way of a thermally insulating layer, and said electronics unit is in thermally conductive contact with a cooling cover as a separate heat sink. In this way, two separate temperature regions of the motor assembly are formed.

For this purpose, the known motor assembly has an electronics housing, wherein a housing shell is formed as the cooling cover. A second housing shell is produced from a plastics material that exhibits poor thermal conductivity, and is designed as a motor carrier for the fastening of the electric motor. An electronics carrier, which has the motor electronics, is arranged within the housing formed by the cooling cover and by the motor carrier. The motor carrier thus insulates the electronics carrier, in terms of heat conduction, with respect to the electric motor and the gearbox housing, such that the motor electronics arranged on the electronics carrier can dissipate heat substantially only via the cooling cover.

In an installation situation in which the motor assembly, in particular the cooling cover, is arranged close to a further heat-emitting component, the problem arises here that the cooling cover cannot dissipate heat to the surroundings by way of heat convection. In this way, the dissipation of heat from the motor electronics is prevented, as a result of which said motor electronics can heat up or overheat during operation, which causes sometimes irreparable damage to the electronic components.

BRIEF SUMMARY OF THE INVENTION

The invention is based on the object of specifying a motor assembly in the case of which an effective dissipation of heat from an electronics unit should be ensured even in an installed situation close to a heat-emitting component. It is also sought to specify an actuator for a motor vehicle having a motor assembly of said type, and to specify a motor vehicle gearbox having an actuator of said type.

According to the invention, the stated object is achieved, with regard to the motor assembly, by way of the features as claimed, with regard to an actuator comprising the motor assembly, by way of the features as claimed, and with regard to a motor vehicle gearbox having an actuator of said type, by way of the features as claimed. The respective sub dependent claims relate to advantageous embodiments and refinements.

The motor assembly according to the invention has an electric motor with a motor housing, and has an electronics unit. The electronics unit comprises a first housing shell which is in the form of a motor carrier and to which the motor housing is fastened. The electronics unit furthermore comprises a second housing shell, which is in the form of a cooling cover, and an electronics carrier, wherein the electronics carrier is arranged in sandwich-like fashion between the motor carrier and the cooling cover. The cooling cover, the electronics carrier and the motor carrier thus form a substantially closed electronics housing, wherein the electronics carrier at least partially forms a housing wall running on an outer circumference. The cooling cover and the motor carrier exhibit greater thermal conductivity than the electronics carrier, wherein the cooling cover and the motor carrier are coupled to one another in heat-conducting fashion at at least one abutment surface. To form the abutment surface, the electronics carrier is, at its outer circumference, therefore engaged over at least in sections by the cooling cover and/or by the motor carrier, wherein the cooling cover and the motor carrier bear against one another for the purposes of heat transfer between the housing shells. In this context, heat transfer is to be understood in particular to mean heat conduction from the cooling cover to the motor carrier.

Therefore, by contrast to the prior art, it is not the case that two separate temperature regions are provided between the electric motor and the electronics unit. Rather, by way of the abutment surface(s), common dissipation of heat from the electric motor and from the electronics unit to one heat sink is made possible. In a preferred installation situation, it is thus possible for heat to be dissipated both from the electric motor and from the electronics unit via a common heat sink, such as for example a gearbox housing. That is to say that (waste) heat of the electronics carrier generated during the operation of the motor assembly is released to the cooling cover, wherein the cooling cover dissipates the received heat via the abutment surface(s) to the motor carrier, which, for cooling or heat dissipation, is preferably connected in thermally conductive fashion to a large thermal mass as a heat sink. In other words, the cooling cover is thus suitable and designed for dissipating heat firstly by way of convection to its surroundings and secondly via the abutment surface(s) to the motor carrier. In particular, in this way, operationally reliable dissipation of heat from the electronics unit is ensured, even in an installation situation in which the cooling cover is arranged close to a further heat-emitting component.

For the purposes of achieving the greatest possible thermal conductivity, the motor carrier and the cooling cover are suitably manufactured from a metal material. In a preferred embodiment, the motor carrier and the cooling cover are in particular produced as die-cast parts from an aluminum material, wherein the electronics carrier is preferably produced as an injection-molded part from a plastics material which exhibits poor thermal conductivity. In this way, particularly straightforward, weight-saving and inexpensive production of the motor assembly is made possible. Furthermore, by way of an abutment surface with a direct aluminum material-on-aluminum material connection, a particularly effective thermal contact surface for heat transmission is realized.

In an advantageous refinement, the motor carrier and the cooling cover are screwed to one another. The motor carrier and the cooling cover are preferably fastened by way of screws to one another in the region of the abutment surfaces, wherein it is preferable for multiple abutment surfaces to be arranged so as to be distributed in a circumferential direction. Owing to the screw connection in the region of the abutment surfaces, particularly areal abutment of the cooling cover against the motor carrier (or vice versa) is ensured because, in the region of the screw connection, a pressing force acts directly between the cooling cover and the motor carrier. The thus improved contact or abutment has an advantageous effect on the heat transfer between the housing shells, such that particularly operationally reliable dissipation of heat from the electronics carrier, or from (motor) electronics carried thereon, is ensured.

In a preferred refinement, for the purposes of particularly effective thermally conductive coupling, the motor carrier and the cooling cover are screwed to one another in particular by way of fastening screws composed of an aluminum material.

In a suitable embodiment, the electronics carrier bears an electronic inverter circuit with an intermediate circuit capacitor, wherein the intermediate circuit capacitor is arranged within a trough-shaped protuberance of the motor carrier. It is preferable for further passive components of the inverter circuit, such as for example an associated throttle coil, to be arranged within the protuberance. As a result, the intermediate circuit capacitor and for example the throttle coil, in a suitable installation situation, dissipate heat directly to the motor carrier and to the heat sink that is coupled in thermally conductive fashion thereto.

Furthermore, owing to the arrangement of the relatively large electronic components within the protuberance, it is made possible to realize a particularly flat cooling cover, which is thus particularly compact in terms of structural space, for the electronics carrier. Furthermore, switching or power electronics of the inverter circuit are arranged for example on that electronics carrier side which is situated opposite the intermediate capacitor, such that the active and passive electronic components do not directly heat one another during operation, which has an advantageous effect on the durability of the inverter circuit.

In an expedient embodiment, the intermediate circuit capacitor, and possibly further passive components such as the throttle coil, are encapsulated within the protuberance with a damping plastics material for the purposes of protection against vibrations. In this way, the durability of the passive components and thus of the inverter circuit is advantageously increased in a structurally simple manner.

In a preferred embodiment, the inverter circuit is coupled in thermally conductive fashion to the cooling cover by way of a thermally conductive layer. In this way, the dissipation of heat into the cooling cover is improved, which has an advantageous effect on the durability of the electronic components. As a thermally conductive layer, use may be made, for example, of a thermally conductive adhesive or a thermally conductive polymer material, such as for example a resin or an epoxy.

In a suitable refinement, for the purposes of particularly effective cooling by heat convection, the cooling cover has a number of cooling fins.

In a preferred embodiment, the motor carrier has at least one thermally conductive fastening surface for the screw fastening of the motor assembly to a heat sink. The fastening surface, which is preferably of the largest possible area, serves as a thermal contact surface with respect to a heat sink, and thus in an installation situation—for the dissipation of heat from the motor assembly.

The at least one fastening surface is preferably simultaneously a flange-like abutment surface between the motor carrier and the cooling cover, wherein preferably, the cooling cover and the motor carrier are jointly fastened by way of screws to the heat sink. In this way, it is firstly the case that the heat transfer and dissipation of heat from the cooling cover are improved. Secondly, particularly operationally reliable assembly and alignability of the motor assembly in a provided structural space are realized in this way.

In a preferred application, the motor assembly is used in an actuator, in particular in a gearbox actuator, for a motor vehicle.

In the preferred installation situation, the actuator is arranged in a motor vehicle gearbox, for example for performing gearshifts in a direct shift gearbox or dual-clutch gearbox.

In a suitable refinement, it is the case in particular that, for this purpose, the motor carrier of the motor assembly dissipates heat via at least one fastening surface to a gearbox housing. In a likewise suitable refinement, the electric motor is situated at least partially in an oil sump. In this way, a structurally particularly advantageous heat dissipation concept for the motor assembly is realized.

During the operation of the motor assembly, substantially two heat sources arise; firstly, a rotating-field coil of the electric motor warms up owing to the electrical current flowing through it, and secondly, the active electronic switching elements of the inverter circuit or of the motor electronics warm up. The motor electronics release operating heat to the cooling cover. The cooling cover is cooled firstly by way of heat convection, wherein furthermore, heat transfer takes place via the abutment surfaces from the cooling cover into the motor carrier, and via the fastening surfaces into the gearbox housing.

In a preferred embodiment, the electric motor is coupled in terms of drive to an oil pump which is preferably situated in the oil sump. At the oil pump side, the motor housing has a rolling bearing for a rotor shaft and has a number of cutouts. During the operation of the oil pump, oil is pumped out of the oil sump through the rolling bearing into the interior of the motor housing, wherein the oil flows back out into the oil sump via the cutouts under the action of gravitational force. In this way, an active exchange of oil takes place between the motor vehicle gearbox and the motor assembly. Through the rolling bearing and the cutouts, the oil of the oil sump thus flows around the rotating-field coil of the electric motor, whereby the rotating-field coil is cooled during operation.

BRIEF DESCRIPTION OF THE SEVERAL VIEWS OF THE DRAWING

Exemplary embodiments of the invention will be discussed in more detail below on the basis of a drawing, in which.

Parts and dimensions which correspond to one another are denoted by the same reference designations throughout the figures.

DESCRIPTION OF THE INVENTION

Figure 1:
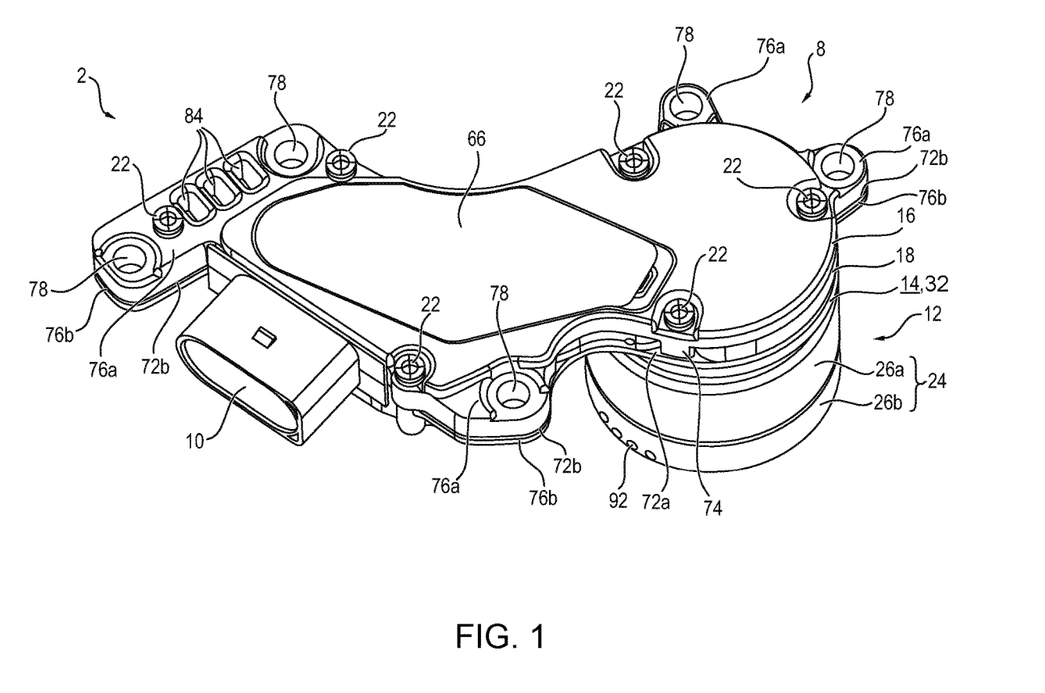
FIG. 1 shows, in a perspective illustration, a motor assembly for a gearbox actuator of a motor vehicle gearbox, comprising an electric motor and an electronics unit.

FIG. 1 illustrates a motor assembly 2 for an actuator 4 of a motor vehicle gearbox 6, in particular of a direct shift gearbox. The motor assembly 2 of the actuator 4, hereinafter also referred to as a gearbox actuator, comprises an elongate electronics unit 8 with a connecting plug connector 10 protruding at the narrow side, and comprises an electric motor 12 which is fastened to the electronics unit 8.

The electronics unit 8 comprises a first housing shell formed as a motor carrier 14, a second housing shell formed as a cooling cover 16, and an electronics carrier 18 arranged in sandwich-like fashion between the motor carrier 14 and the cooling cover 16. Here, the connecting plug connector 10 is integrally formed in unipartite fashion on a face side of the electronics carrier 18. By way of the connecting plug connector 10, an inverter circuit 20 of the electronics carrier 18 can be coupled in electrically conductive fashion to motor vehicle electronics (not illustrated in any more detail) or to a motor vehicle harness for the purposes of energization and operation of the electric motor 12.

Figure 2:
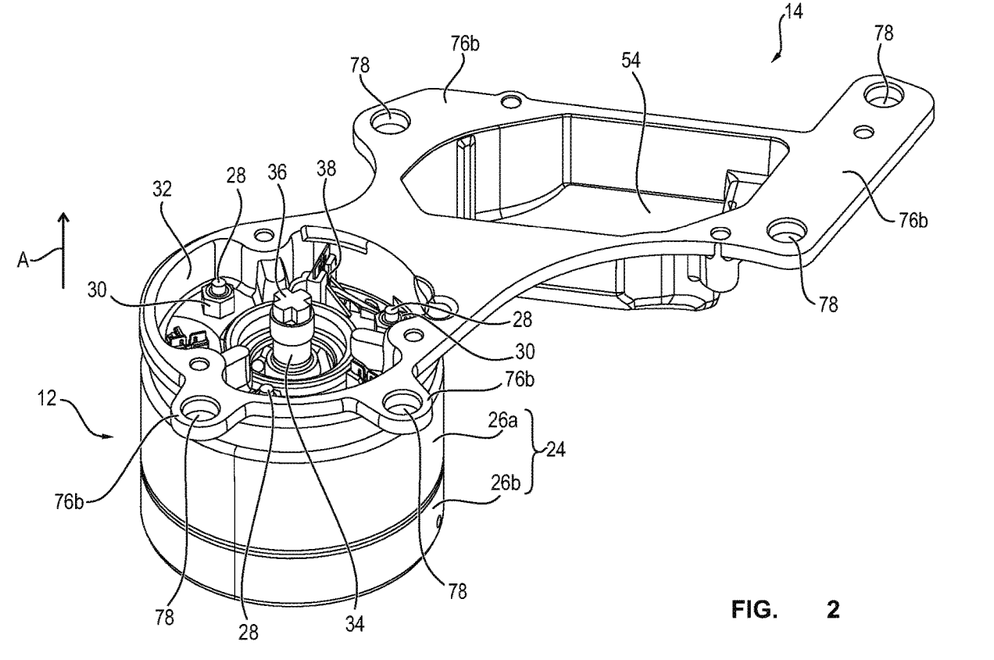
FIG. 2 shows, in a perspective illustration, a motor carrier of the electronics unit with the electric motor.

The motor carrier 14 and the cooling cover 16 are screwed together by way of six circumferentially distributed fastening screws 22, wherein the electronics carrier 18 is held clamped, or fixed by clamping, between the motor carrier 14 and the cooling cover 16. As can be seen in particular in FIG. 2, a cylindrical motor housing 24 of the preferably brushless electric motor 12 is fastened by way of screws to the motor carrier 14.

Figure 3:
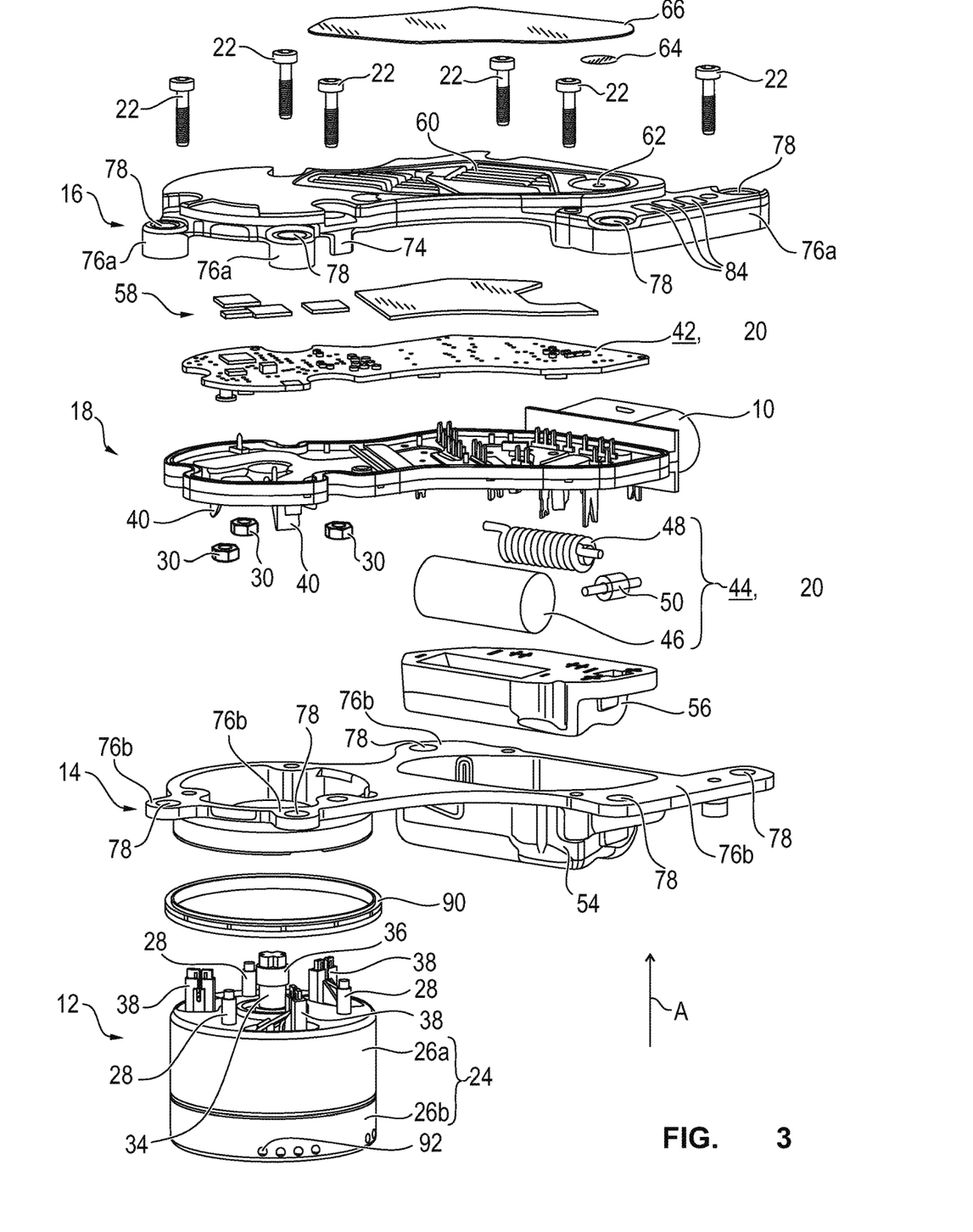
FIG. 3 shows, in a perspective exploded illustration, the motor assembly.

FIG. 3 shows the motor assembly 2 in a disassembled state by way of an exploded illustration.

The cylindrical motor housing 24 of the illustrated electric motor 12 is formed substantially by a first, pot-shaped housing half 26a and a second, pot-shaped housing half 26b, wherein the housing half 26a may be dimensioned so as to have a housing height approximately twice that of the housing half 26b as viewed in an axial direction A. In the assembled state, the housing half 26a is fastened to the motor carrier 14 by way of three stud bolts 28, which are arranged, so as to be approximately uniformly offset with respect to one another by 120°, on the face side on the surface facing toward the motor carrier 14. As can be seen in particular in FIG. 2, in the assembled state, the stud bolts 28 are fastened, from the direction of the inner side of the motor carrier 14, to the motor carrier 14 in the region of a cylindrical protuberance 32 by way of in each case one hexagonal nut 30.

In the assembled state, a rotor shaft 34 of a rotor, coupled in terms of drive to said rotor shaft, of the electric motor 12 protrudes out centrally through the housing half 26a. A magnetic cap 36 as a magnetic dipole encoder is attached rotationally conjointly to the motor carrier-side face side of the rotor shaft 34. The cap 36 has a number of permanent magnets, and in the assembled state, lies in a receptacle (not illustrated in any more detail) of the electronics carrier 18. A sensor element is arranged in the region of the receptacle, which sensor element, during the operation of the motor assembly 2, monitors a motor rotational speed of the electric motor 12 by way of the alternating magnetic field of the rotating cap 36.

On the face side, the electric motor 12 has three clamping contacts (insulation displacement contacts) 38 which protrude out of the housing half 26a and which are coupled in electrically conductive fashion to phase windings of a three-phase rotating-field coil (not illustrated in any more detail) of a stator assembly. The insulation displacement contacts 38 are, in the assembled state, contacted with in each case one motor-side blade contact 40 of the electronics carrier 18 for the energization of the rotating-field coil.

The electronic inverter circuit 20 of the electronics carrier 18 comprises a printed circuit board 42 with a number of switching elements (not designated in any more detail), and a passive component group 44. The component group 44 comprises substantially a circuit capacitor (intermediate circuit capacitor) 46, a throttle coil 48 and a protective fuse 50. The printed circuit board 42 is arranged on a side, facing toward the cooling cover 16 and hereinafter also referred to as top side, of the electronics carrier 18. The component group 44 is arranged on the opposite flat side, facing toward the motor carrier 14 and correspondingly hereinafter also referred to as bottom side, of the electronics carrier 18.

For the contacting of the printed circuit board 42 with the component group 44, the electronics carrier 18 has an integrated (insert-molded) lead frame 52 which couples the individual electronic components in electrically conductive fashion by way of a number of contacts (not designated in any more detail). The lead frame 52 is furthermore expediently coupled in electrically conductive fashion to the connecting plug connector 10.

In the assembled state, the component group 44 is arranged within a trough-like protuberance 54 of the motor carrier 14. For protection against vibrations, the component group 44 is at least partially encapsulated within the protuberance 54 by way of a cast part 56 composed of a damping plastics material.

The printed circuit board 42 is coupled in thermally conductive fashion to the cooling cover 16 by way of a heat-conducting layer 58, for example in the form of a thermally conductive adhesive. The cooling cover 16 has, on its outer surface, that is to say on the cooling cover side averted from the electronics carrier 18, a number of integrally formed cooling fins 60. By way of example, only one cooling fin 60 is denoted by a reference designation in the figures.

In the region of the cooling fins 60, there is arranged a cutout 62 which, in the assembled state, permits an exchange of air from the printed circuit board 42 to a region outside the cooling cover 16. In the assembled state, the cutout 62 is covered in water-tight fashion by way of a semipermeable diaphragm 64, which is permeable to air. The diaphragm 64 firstly permits an exchange of air, for cooling purposes, and secondly prevents an ingress of water or moisture, for the purposes of protecting the inverter circuit 20. The cooling fins 60 and the diaphragm 64 are, in the assembled state, concealed by a common cover 66.

Figure 4:
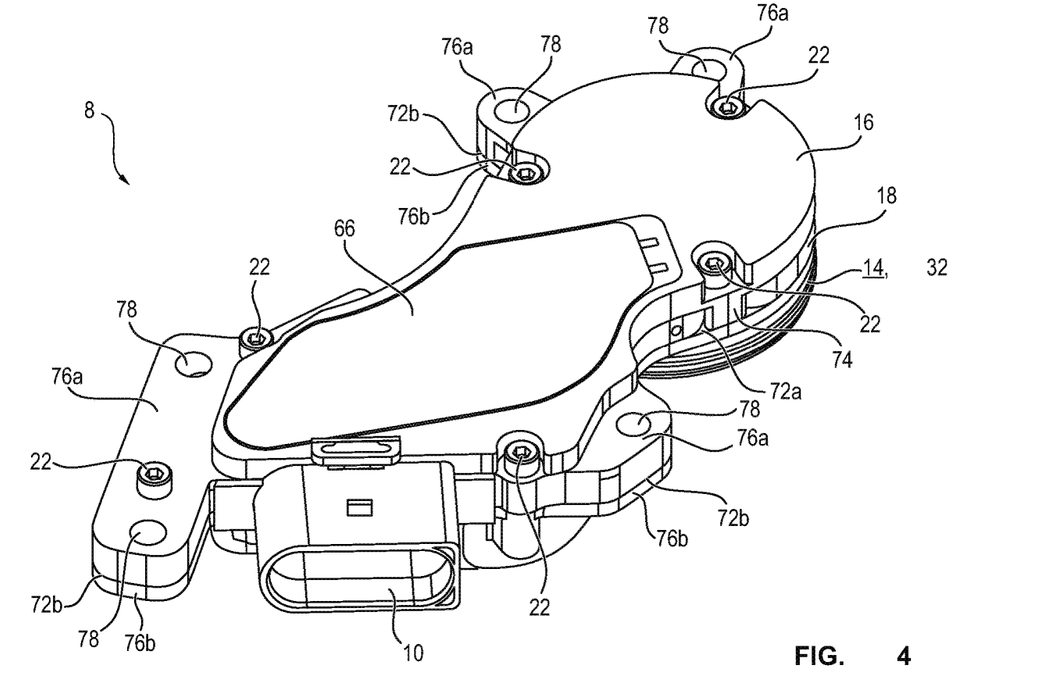
FIG. 4 shows, in a perspective illustration, the electronics unit, with a view of a cooling cover.
Figure 5:
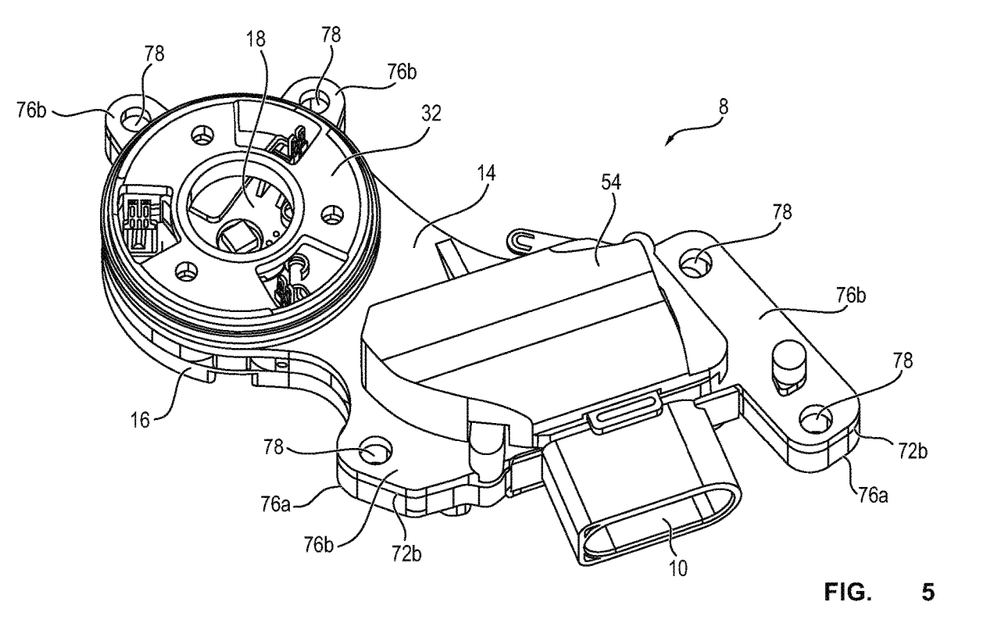
FIG. 5 shows, in a perspective illustration, the electronics unit, with a view of the motor carrier.

During the operation of the motor assembly 2, heat is generated firstly by the printed circuit board 42, owing to the switching of the active electronic components, and heat is generated secondly by the energized rotating-field coils of the electric motor 12. A heat dissipation concept for the motor assembly 2 for the dissipation of the generated heat into the motor vehicle gearbox 6 as a heat sink will be discussed below on the basis of FIGS. 4 to 6.

In the assembled state, a top-side housing chamber 68 is formed between the electronics carrier 18 and the cooling cover 16. As can be seen in particular in FIG. 6, the housing chamber 68 is at least partially filled with the layer 58, and is separated in fluid-tight fashion by way of the electronics carrier 18 from a bottom-side housing chamber 70 between the electronics carrier 18 and the motor carrier 14. The housing chamber 70 is formed substantially by the subregions 70a, 70b defined by the protuberances 32 and 54. Below, the subregion 70a of the protuberance 32 will also be referred to as a terminal region 70a, and the subregion 70b of the protuberance 54 will also be referred to as a circuit region 70b.

During operation, the printed circuit board 42 dissipates heat via the layer 58 to the cooling cover 16. The cooling cover 16 is preferably produced as a die-cast part from an aluminum material. Furthermore, the layer 58 and the printed circuit board 42 are at least partially flowed around by air. The air discharges at least a part of the generated heat of the printed circuit board 42 out of the housing chamber 68 via the cutout 62. The warmed-up air exits with moisture at least partially being condensed on the cooling fins 60, wherein the diaphragm 64 prevents the moisture from entering the housing chamber 68.

The cooling cover 16 releases the (waste) heat of the printed circuit board 42 firstly to a surrounding region by way of (heat) convection and secondly to the motor carrier 14 via thermally conductive thermal contact surfaces 72a, 72b. For the purposes of improved heat conduction, the motor carrier 14 is, similarly to the cooling cover 16, produced in particular as a die-cast part from an aluminum material. The electronics carrier 18 is produced as an injection-molded part from a plastics material with poor thermal conductivity, such that heat transfer takes place substantially only at the thermal contact surfaces 72a, 72b. For this purpose, the electronics carrier 18 is, at the circumference, engaged around at least in sections by the thermal contact surfaces 72a, 72b.

The thermal contact surfaces 72a will hereinafter also be referred to as abutment surface of the cooling cover 16 on the motor carrier 14, and may be formed substantially by three spacer elements 74 which engage around the electronics carrier 18 substantially in the region of the fastening screws 22 in the terminal region 70a of the motor carrier 14. The spacer elements 74 are integrally formed on the cooling cover 16 in the region of a contact edge between the cooling cover 16 and the electronics carrier 18, and protrude beyond the cooling cover 16 in the direction of the motor carrier 14. Here, the spacer elements 74 are of approximately equal dimensions to the thickness of the electronics carrier 18.

The thermal contact surfaces 72b are formed substantially between four circumferentially protruding projections 76a of the cooling cover 16 and four complementary projections 76b of the motor carrier 14, wherein the projections 76a, 76b are arranged one on top of the other in an aligned manner in the assembled state. The projections 76a may have a greater thickness than the projections 76b, wherein the projections 76a—similarly to the spacer elements 74—engage around the electronics carrier 18 at least in sections in the assembled state so as to form the thermal contact surfaces 72b. Close to the terminal region 17a, the projections 76a, 76b are integrally formed, approximately in the manner of eyelets, on the motor carrier 14 and on the cooling cover 16, wherein the projections 76a, 76b around the circuit region 70b are in the form of elongate lugs.

The projections 76a, 76b have five screw holes 78 which are arranged so as to be distributed in the circumferential direction. As can be seen in particular in FIG. 6, in the assembled state of the gearbox actuator 4 on a motor vehicle gearbox 6, there is arranged within the screw holes 78 in each case one fastening screw 80 for the screw fastening of the gearbox actuator 4 to a gearbox housing 82 of the motor vehicle gearbox 6. The thermal contact surfaces 72b will hereinafter also be referred to as fastening surfaces. The gearbox housing 82 has a large thermal mass, and in the assembled state, serves as a heat sink for the motor assembly 2, in particular for the electronic component group 44.

The cooling cover 16 thus dissipates heat by way of the abutment surfaces 72a and fastening surfaces 72b, via the motor carrier 14, to the gearbox housing 82. For the purposes of particularly effective heat transfer, the fastening screws 22 and 80 are preferably produced from a thermally conductive material, in particular from an aluminum material. Furthermore, the cooling cover 16 in the exemplary embodiments illustrated in FIGS. 1 and 3 has, in the region of one of the lug-like fastening surfaces 72b, three recess-like depressions 84 as cooling fins for additional heat dissipation from the projection 76a by way of convection.

During the operation of the motor assembly 2, the passive components of the component group 44 dissipate heat via the motor carrier 14 to the gearbox housing 82. In the assembled state of the gearbox actuator 4, the electric motor 12 is coupled in terms of drive to an oil pump 86 (not illustrated in any more detail), and is situated at least partially in an oil of an oil sump 88. For the fluid-tight sealing of the oil sump 88, a seal ring 90 is arranged between the protuberance 32 and the gearbox housing 82. The housing half 26b has a number of circular cutouts 92 such that oil for cooling the rotating-field coil flows out of the oil sump 88 into the interior of the motor housing 24. By way of example, in each case only one cutout 92 is denoted by a reference designation in the figures. During the operation of the electric motor 12, the energized rotating-field coil thus dissipates heat via the oil into the oil sump 88, and at least partially via the motor carrier 14 into the gearbox housing 82.

Figure 6:
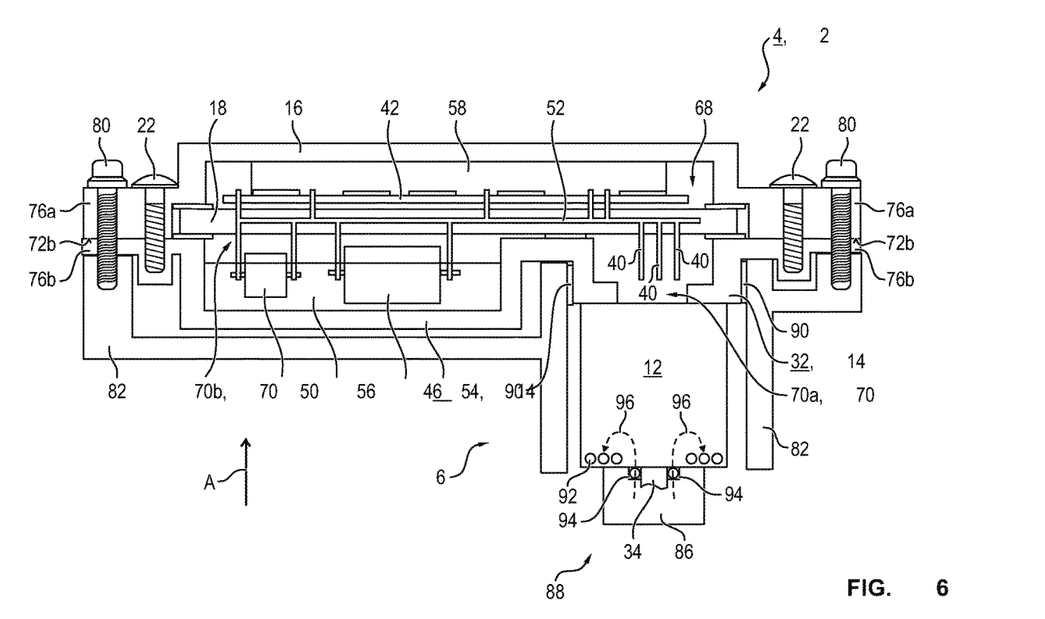
FIG. 6 shows, in a schematic sectional illustration, the gearbox actuator in an installed situation on a gearbox housing of the motor vehicle gearbox.

The electromotive oil pump 86 preferably generates a positive pressure of the oil upstream of a rolling bearing 94 of the electric motor 12. In this way, oil passes out of a pump region of the oil sump 88 into the interior of the motor housing 24 through the rolling bearing 94. Under the action of gravity, the oil flows back into the oil sump 88 through the cutouts 92. In other words, during operation, the oil pump 86 conveys leakage oil into the electric motor 12, such that an additional oil flow 96 into the electric motor 12 is generated. The oil flow 96 is schematically indicated in FIG. 6 by way of dashed lines.

The invention is not restricted to the exemplary embodiments described above. Rather, other variants of the invention may also be derived from these by a person skilled in the art, without departing from the subject matter of the invention. In particular, it is also the case that all individual features described in conjunction with the exemplary embodiments may also be combined with one another in some other way without departing from the subject matter of the invention.

LIST OF REFERENCE DESIGNATIONS

2 Motor assembly
4 Gearbox actuator/actuator
6 Motor vehicle gearbox
8 Electronics unit
10 Connecting plug connector
12 Electric motor
14 Motor carrier/housing shell
16 Cooling cover/housing shell
18 Electronics carrier
20 Inverter circuit
22 Fastening screws
24 Motor housing
26a, 26b Housing half
28 Stud bolt
30 Hexagonal nut
32 Protuberance
34 Rotor shaft
36 Cap
38 Clamping contact/insulation displacement contact
40 Blade contact
42 Printed circuit board
44 Component group
46 Circuit capacitor/intermediate circuit capacitor
48 Throttle coil
50 Protective fuse
52 Lead frame
54 Protuberance
56 Cast part
58 Layer
60 Cooling fin
62 Cutout
64 Diaphragm
66 Cover
68 Housing chamber
70 Housing chamber
70a Subregion/terminal region
70b Subregion/circuit region
72a Thermal contact surface/abutment surface
72b Thermal contact surface/fastening surface
74 Spacer elements
76a, 76b Projection
78 Screw hole
80 Fastening screw
82 Gearbox housing/heat sink
84 Depression/cooling fin
86 Oil pump
88 Oil sump
90 Seal ring
92 Cutout
94 Rolling bearing
96 Oil flow
A Axial direction

The invention claimed is:

1. A motor assembly, comprising:
an electric motor having a motor housing;
an electronics unit including: a first housing shell being a motor carrier and having said motor housing fastened thereto; a second housing shell being a cooling cover;
an electronics carrier sandwiched between said motor carrier and said cooling cover;
said motor carrier, said electronics carrier and said cooling cover together forming an electronics housing, a peripheral surface of said electronics carrier forming a portion of an outer surface of a housing wall of said electronics housing extending around an outer circumference of said electronics housing and said cooling cover being formed with spacer elements that project over said housing wall;
said cooling cover and said motor carrier having a thermal conductivity greater than a thermal conductivity of said electronics carrier; and
said cooling cover and said motor carrier being coupled to one another in heat-conducting fashion by way of at least one abutment surface formed by said spacer elements, and
said motor carrier being formed with at least one projection having a thermally conductive fastening surface for screw-fastening the motor assembly to a heat sink, said thermally conductive fastening surface being a flange-shaped abutment surface between said motor carrier and said cooling cover, said cooling cover and said motor carrier being jointly fastened to the heat sink, and the motor carrier positioned between the cooling cover and the heat sink; and
an electronic inverter circuit with an intermediate circuit capacitor disposed on said electronics carrier, said intermediate circuit capacitor being disposed within a trough-shaped protuberance of said motor carrier and encapsulated within said protuberance.

2. The motor assembly according to claim 1, wherein said motor carrier and said cooling cover are formed of an aluminum material, and said electronics carrier is formed of a plastics material.

3. The motor assembly according to claim 1, wherein said motor carrier and said cooling cover are screwed directly to one another.

4. The motor assembly according to claim 1, which comprises a thermally conductive layer heat-conductively coupling an inverter circuit to said cooling cover.

5. The motor assembly according to claim 1, wherein said cooling cover is formed with a plurality of cooling fins.

6. An actuator for a motor vehicle, the actuator comprising a motor assembly according to claim 1.

7. The actuator according to claim 6, configured as a gearbox actuator.

8. A motor vehicle gearbox, comprising an actuator having a motor assembly according to claim 1.

9. The motor vehicle gearbox according to claim 8, which comprises at least one fastening surface configured for dissipating heat from said motor carrier, via said at least one fastening surface, to a gearbox housing, where the gearbox housing is the heat sink.

10. The motor vehicle gearbox according to claim 8, wherein the electric motor is disposed at least partially in an oil sump.

11. The motor vehicle gearbox according to claim 10, wherein said electric motor is coupled for driving an oil pump, wherein said motor housing has, at an oil pump side, a rolling bearing for a rotor shaft and a plurality of cutouts, and wherein, during operation, said oil pump conveys oil out of the oil sump through the rolling bearing into an interior of said motor housing, whereupon the oil flows back out into the oil sump via the cutouts.

\* \* \* \* \*